United States Patent
Moore et al.

(10) Patent No.: US 8,146,823 B2
(45) Date of Patent: *Apr. 3, 2012

(54) METHOD AND APPARATUS FOR RAPID IMAGE CAPTURE IN AN IMAGE SYSTEM

(75) Inventors: James W. Moore, Renton, WA (US); Danny S. Barnes, Maple Valley, WA (US); Matthew E. Allen, Liberty Lake, WA (US); Bruce R. Scharf, Seattle, WA (US)

(73) Assignee: Microscan Systems, Inc., Renton, WA (US)

(*) Notice: Subject to any disclaimer, the term of this patent is extended or adjusted under 35 U.S.C. 154(b) by 1085 days.

This patent is subject to a terminal disclaimer.

(21) Appl. No.: 12/029,387

(22) Filed: Feb. 11, 2008

(65) Prior Publication Data

US 2008/0128503 A1 Jun. 5, 2008

Related U.S. Application Data

(63) Continuation-in-part of application No. 11/541,317, filed on Sep. 28, 2006, now Pat. No. 7,341,190, which is a continuation of application No. 10/052,678, filed on Jan. 18, 2002, now Pat. No. 7,118,042.

(51) Int. Cl.
*G06K 7/10* (2006.01)
(52) U.S. Cl. ............... 235/462.48; 235/454; 235/462.14; 235/462.41; 235/462.45; 235/462.49; 235/472.01
(58) Field of Classification Search .................. 235/375, 235/383, 385, 462.01, 462.07–462.11, 462.14, 235/462.2, 462.24, 462.41, 462.45, 462.48, 235/462.49, 472.01–472.03, 470, 454, 462.15
See application file for complete search history.

(56) References Cited

U.S. PATENT DOCUMENTS

| | | | |
|---|---|---|---|
| 4,516,265 A | 5/1985 | Kizu et al. |
| 4,689,490 A | 8/1987 | Thomas et al. |
| 5,258,605 A | 11/1993 | Metlitsky et al. |
| 5,291,564 A | 3/1994 | Shah et al. |
| 5,372,238 A | 12/1994 | Bonnet |

(Continued)

FOREIGN PATENT DOCUMENTS

EP 0851376 A1 7/1998

(Continued)

OTHER PUBLICATIONS

PCT International Preliminary Examination Report, International Application No. PCT/US03/01470, date of mailing Jun. 30, 2005.

(Continued)

*Primary Examiner* — Tuyen K Vo
(74) *Attorney, Agent, or Firm* — Blakely Sokoloff Taylor & Zafman LLP

(57) ABSTRACT

Embodiments of a method, apparatus, and article of manufacture for rapidly capturing images in an automated identification system to effectively extend one dimension of a field of view of an image system are disclosed herein. In one embodiment, the image system captures and processes multiple images of at least a portion of a surface of a component in the automated identification system in response to a trigger signal communicated from a triggering device configured to sense a location of the component. Various embodiments of the invention include multiple sources for capturing images, and/or multiple user-specified schemas for effectively extending the field of view of the image system along the axis of component travel in the automated identification system.

36 Claims, 10 Drawing Sheets

U.S. PATENT DOCUMENTS

| | | | |
|---|---|---|---|
| 5,510,603 | A | 4/1996 | Hess et al. |
| 5,515,962 | A | 5/1996 | Kennedy et al. |
| 5,525,788 | A | 6/1996 | Bridgelall et al. |
| 5,768,023 | A | 6/1998 | Sawaki et al. |
| 5,770,841 | A | 6/1998 | Moed et al. |
| 5,770,848 | A * | 6/1998 | Oizumi et al. .......... 235/462.14 |
| 5,773,808 | A | 6/1998 | Laser |
| 5,880,451 | A | 3/1999 | Smith et al. |
| 5,914,476 | A * | 6/1999 | Gerst et al. .............. 235/462.07 |
| 5,923,017 | A | 7/1999 | Bjorner et al. |
| 5,962,838 | A | 10/1999 | Tamburrini |
| 6,073,849 | A | 6/2000 | Colley et al. |
| 6,236,735 | B1 | 5/2001 | Bjorner et al. |
| 6,237,293 | B1 | 5/2001 | Gembala |
| 6,267,293 | B1 | 7/2001 | Dwinell et al. |
| 6,431,452 | B2 | 8/2002 | Feng |
| 6,499,662 | B1 | 12/2002 | Coleman et al. |
| 6,502,750 | B1 | 1/2003 | Barnes et al. |
| 6,505,778 | B1 | 1/2003 | Reddersen et al. |
| 6,560,741 | B1 | 5/2003 | Gerety et al. |
| 6,651,886 | B2 | 11/2003 | Gurevich et al. |
| 6,976,155 | B2 * | 12/2005 | Drysdale et al. .............. 712/225 |
| 7,118,042 | B2 | 10/2006 | Moore et al. |
| 7,341,190 | B2 | 3/2008 | Moore et al. |
| 2001/0003346 | A1 * | 6/2001 | Feng ........................ 235/472.01 |
| 2002/0170970 | A1 * | 11/2002 | Ehrhart .................... 235/462.41 |

FOREIGN PATENT DOCUMENTS

| | | |
|---|---|---|
| JP | 7282171 (A) | 10/1995 |
| JP | 319989 (A) | 12/1995 |
| JP | 11225291 (A) | 8/1999 |

OTHER PUBLICATIONS

PCT International Search Report, International Application No. PCT/US03/01470, Mail date Jun. 26, 2003.

PCT Written Opinion, International Application No. PCT/US03/01470, Mail date Dec. 17, 2004.

U.S. Office Action mailed Mar. 10, 2003, U.S. Appl. No. 10/052,678, filed Jan. 18, 2002 (13 pages).

U.S. Office Action mailed Aug. 13, 2003, U.S. Appl. No. 10/052,678, filed Jan. 18, 2002 (14 pages).

U.S. Office Action mailed Nov. 20, 2003, U.S. Appl. No. 10/052,678, filed Jan. 18, 2002 (4 pages).

U.S. Office Action mailed Mar. 2, 2004, U.S. Appl. No. 10/052,678, filed Jan. 18, 2002 (14 pages).

U.S. Office Action mailed Jun. 28, 2004, U.S. Appl. No. 10/052,678, filed Jan. 18, 2002 (12 pages).

U.S. Office Action mailed Dec. 29, 2004, U.S. Appl. No. 10/052,678, filed Jan. 18, 2002 (14 pages).

U.S. Office Action mailed Jun. 15, 2005, U.S. Appl. No. 10/052,678, filed Jan. 18, 2002 (12 pages).

U.S. Office Action mailed Dec. 19, 2005, U.S. Appl. No. 10/052,678, filed Jan. 18, 2002 (10 pages).

U.S. Notice of Allowance mailed Jun. 6, 2006, U.S. Appl. No. 10/052,678, filed Jan. 18, 2002 (9 pages).

U.S. Office Action mailed Apr. 17, 2007, U.S. Appl. No. 11/541,317, filed Sep. 28, 2006 (14 pages).

U.S. Notice of Allowance mailed Oct. 11, 2007, U.S. Appl. No. 11/541,317, filed Sep. 28, 2006 (11 pages).

* cited by examiner

METHOD AND APPARATUS FOR RAPID IMAGE CAPTURE IN AN IMAGE SYSTEM

CROSS-REFERENCE TO RELATED APPLICATIONS

This application is a continuation-in-part (CIP) of U.S. patent application Ser. No. 11/541,317, filed 28 Sep. 2006 and still pending, which in turn is a continuation of U.S. patent application Ser. No. 10/052,678, filed 18 Jan. 2002 and now U.S. Pat. No. 7,118,042.

TECHNICAL FIELD OF THE INVENTION

This disclosure relates generally to an imaging system for reading and analyzing optically encoded symbols or images, and more particularly, but not exclusively, to a method, apparatus, and article of manufacture for rapidly capturing images in an image system to effectively extend a horizontal field of view and enhance image processing quality.

BACKGROUND INFORMATION

The automatic identification industry has improved the productivity and efficiency with which data may be collected in inventory control, product flow, quality control, purchasing, and other related business activities. One automated mechanism for collecting data is through the use of devices that read and decode bar codes, for example bar codes on product labels in retail applications.

A number of different bar code readers and laser scanning systems have been developed to read and interpret bar codes. In general, bar code scanners utilize a laser diode to produce a beam that is scanned across the bar code in a manner to enable reflections returned by the scanning beam to be analyzed and interpreted. However, as the need for greater information storage capacity has increased, traditional bar codes (e.g., a one-dimensional array of spaced lines of varying widths) are being replaced with symbol codes (e.g., two-dimensional bar codes or "matrix codes").

Symbol codes generally comprise multiple rows of lines and spaces stacked upon one another, and are generally capable of storing approximately 100 times more information in the same space occupied by a traditional one-dimensional bar code. Symbol code scanners typically consist of an imaging system including a charge coupled device ("CCD") that captures an image, stores the image in a memory, and then processes the image using software to convert the captured image into an output signal, which may be interpreted for a given application.

Some applications require reading images (i.e., symbol codes) at a relatively high speed as the image is presented to the reader via a conveyor belt, for example. These applications are prevalent in small package distribution, letter sorting, and in industrial and pharmaceutical manufacturing, for instance. When imaging at high speed, one problem typically encountered is the difficulty in maintaining image-processing quality. Image-processing quality is a measure of good and accurate reads of the target symbol codes. For example, in a high-speed conveyor belt application, a trigger (e.g., an optical sensor) may be used to indicate (e.g., based on timing or physical parameters), to the imaging system, the time to capture an image (i.e., the moment when the symbol code is within the field of view of the imaging system). If the imaging system is unable to capture a complete image of the target symbol code, the imaging system may inaccurately identify a component (to which the symbol code is affixed) as being unacceptably labeled, and cause the component to be removed from the line.

The image capture elements (e.g., a lens and CCD array) of an imaging system generally have only a limited field of view. As such, it is imperative that the target symbol code be positioned in a location, at the time of image capture, to enable a complete image of the symbol code to be captured for processing and interpretation in order to maintain high image-processing quality for a given application. Depending on the speed of the application, slight discrepancies in the speed of the conveyor belt, or the position of the symbol code on a component, for example, can greatly impact image-processing quality.

SUMMARY OF THE ILLUSTRATED EMBODIMENTS

An aspect of the illustrated embodiments is to provide a method, apparatus, and article of manufacture for rapidly capturing images in an automated identification system to effectively extend one dimension of a field of view of an image system. In one embodiment, the image system captures and processes multiple images of at least a portion of a surface of a component in the automated identification system in response to a trigger signal communicated from a triggering device configured to sense a location of the component. Various embodiments of the invention include multiple sources for capturing images, and/or multiple user-specified schemas for effectively extending the field of view of the image system along the axis of component travel in the automated identification system.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Figure 1:
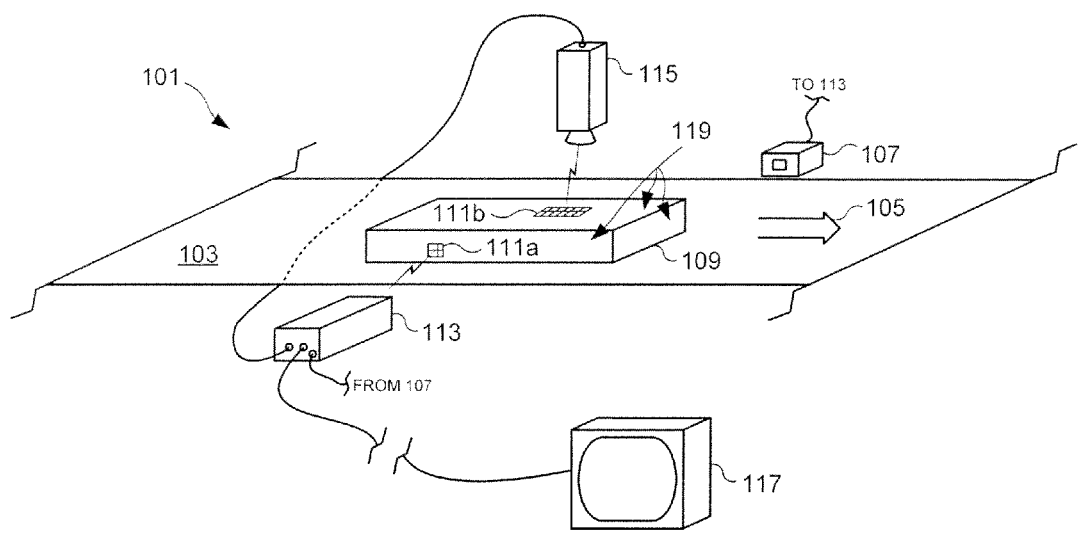
FIG. 1 is an illustration of an embodiment of an automated identification system including an image system in an example imaging application in accordance with the teachings of the present invention.

Embodiments of a method, apparatus, and article of manufacture for rapid image capture in an image system are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, apparatus, and article of manufacture for rapidly capturing multiple images in series via an image system to effectively increase one dimension of a field of view of the image system, and thereby increase image-processing quality in an automated identification system. In a representative embodiment in accordance with the teachings of the present invention, an image system, including an image sensor (e.g., a complimentary metal oxide semiconductor ("CMOS") image sensor), serially captures multiple (i.e., two or more) images in response to a trigger signal generated by a triggering device. In one embodiment, the triggering device may comprise an optical sensor that may generate the trigger signal in response to a location of a component on a conveyor belt, for example. The multiple captured images may be stored in a memory and then be processed to identify and read symbol codes (e.g., matrix codes) affixed to the component to aid in identification and/or tracking in various applications.

In other embodiments in accordance with the teachings of the present invention, the image system may be coupled to one or more additional sources (e.g., an external video camera) for capturing images of portions of the component. The image system may switch between the multiple sources, in an embodiment, based on user-specified criteria including parameters such as image-capture-quantity, time, or the like. In one instance, the image system may be coupled to a display to enable a user to view captured images in real-time and preliminarily assess the image-processing quality of the automated identification system. Other features of the illustrated embodiments will be apparent to the reader from the foregoing and the appended claims, and as the detailed description and discussion is read in conjunction with the accompanying drawings.

With reference now to the drawings, and in particular to FIG. 1, an embodiment of an automated identification system 101 is illustrated in accordance with the teachings of the present invention. In the illustrated embodiment, the automated identification system 101 includes an image system 113 coupled to an external camera 115 and a display 117. As a component 109 in the automated identification system 101 travels along a conveyer belt 103 in the direction of travel indicated by the arrow having reference numeral 105, a triggering device 107 senses the location of the component 109 on the conveyor belt 103, and communicates a trigger signal to the image system 113.

In one embodiment, the triggering device 107 may comprise an optical sensor which transmits and detects a reflected beam (not shown) for example, and which identifies the presence of an object (e.g., the component 109) at a location on the conveyor belt 103 via an interference with the reflected beam. In response to the trigger signal communicated from the triggering device 107, the image system 113 may capture multiple images of at least a portion of a surface 119 of the component 109. The multiple images may then be stored and processed to identify and read any symbol codes (e.g., symbol codes 111a and 111b) affixed to the surface 119 of the component 109 to enable tracking or identification of the component 109, and to ensure that acceptable identifying information has been affixed to the component 109 via a matrix code or the like, as desired by the user.

In various embodiments in accordance with the teachings of the present invention, the multiple images of the surface 119 of the component 109 may be captured via any one of a number of sources, such as an internal image sensor of the image system 113, as will be discussed in greater detail below, via the external camera 115, or via other sources coupled to the image system 113. In addition, a user may define one or more parameters to cause the image system 113 to switch between the various sources to capture images of different portions of the surface 119 of the component 109, in an embodiment. The one or more parameters may include for example, an image-capture-quantity parameter, which may be defined and activated by a user to cause the image system 113 to switch between sources following the capture of a defined number of images by any one source. Another of the one or more parameters may comprise a time parameter, which also may be defined and activated by the user to cause the image system 113 to switch between sources after a defined period of time has elapsed.

In other embodiments, the user may define an interval of time to elapse between each image capture, regardless of source, to adjust the effective field of view of the image system 113 in the automated identification system 101. In embodiments in accordance with the teachings of the present invention, the interval may comprise an identical period of time between pairs of successive image captures, or may vary with each successive pair of image captures. In one embodiment, the interval may be defined as zero to cause a continuous image capture limited only by the capture rate of the source.

As mentioned previously, in one embodiment the image system 113 may be coupled to a display 117 to enable generation of real-time visual renderings of the captured images. This video output feature may enable the user to quickly assess the image-processing quality of the automated identification system 101 by identifying whether the affixed symbol codes 111a and/or 111b are being captured in the multiple images.

Figure 2:
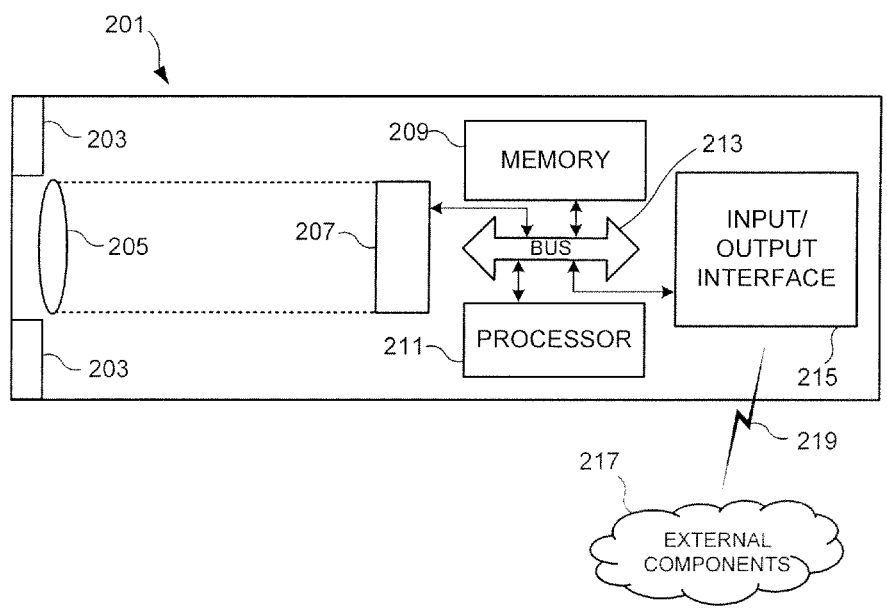
FIG. 2 is block diagram illustration of one embodiment of image system in accordance with the teachings of the present invention.

With reference now primarily to FIG. 2, a block diagram illustrating one embodiment of an apparatus 201 that may be used for the image system 113 is shown in accordance with the teachings of the present invention. In the illustrated embodiment, the apparatus 201 includes an illumination element 203, which may comprise a plurality of light emitting diodes ("LED"), or the like, to illuminate the surface 119 of the component 109 (see, e.g., FIG. 1) to enable images to be captured. The apparatus 201 also includes a lens 205 for collecting and focusing light onto an internal image sensor 207, which may comprise a CCD, a CMOS image sensor, or other suitable device, in various embodiments.

The image sensor 207 may be coupled to a bus 213 to enable communication with other elements of the apparatus 201. A memory 209 and a processor 211 may also be coupled to the bus 213, in an embodiment. The processor 211 may be a suitable commercially available processor, digital signal processor ("DSP"), or the like. The memory 209 may be a machine-readable medium such as dynamic random access memory ("DRAM"), and may include static random access memory ("SRAM") or other types of suitable memory devices. In one embodiment, the memory 209 may also include machine-readable media such as for example, but not limited to, a magnetic hard disk, a floppy disk, an optical disk, a read-only memory component ("ROM"), a smart card, or another form of storage for data. In one embodiment, the memory 209 may include removable media, read-only memory, readable/writable memory, or the like. For the purpose of the specification, the term "machine-readable medium" shall be taken to include any medium that is capable of storing data, information, or encoding a sequence of instructions or operations for execution by the processor 211 to cause the processor 211 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

In one embodiment, the apparatus 201 may interface to external components 217, such as for example but not limited to, the triggering device 107, the external camera 115, and/or the display 117, through an input/output interface 215. The input/output interface 215 may include a transceiver compatible with analog and/or digital signals in any one of a variety of formats. For example, the external camera 115 may transmit an analog serial communication such as RS-170 (Recommended Standard 170), which may then be converted by an analog-to-digital converter (not shown) for processing by the processor 211. In one embodiment, a carrier wave signal 219 may be received/transmitted by the input/output interface 215 to communicate with an external component 217. In one embodiment, the carrier wave signal 219 is considered to be machine-readable media, and may be transmitted through wires, cables, optical fibers, or through free-space, or the like.

Figure 3:
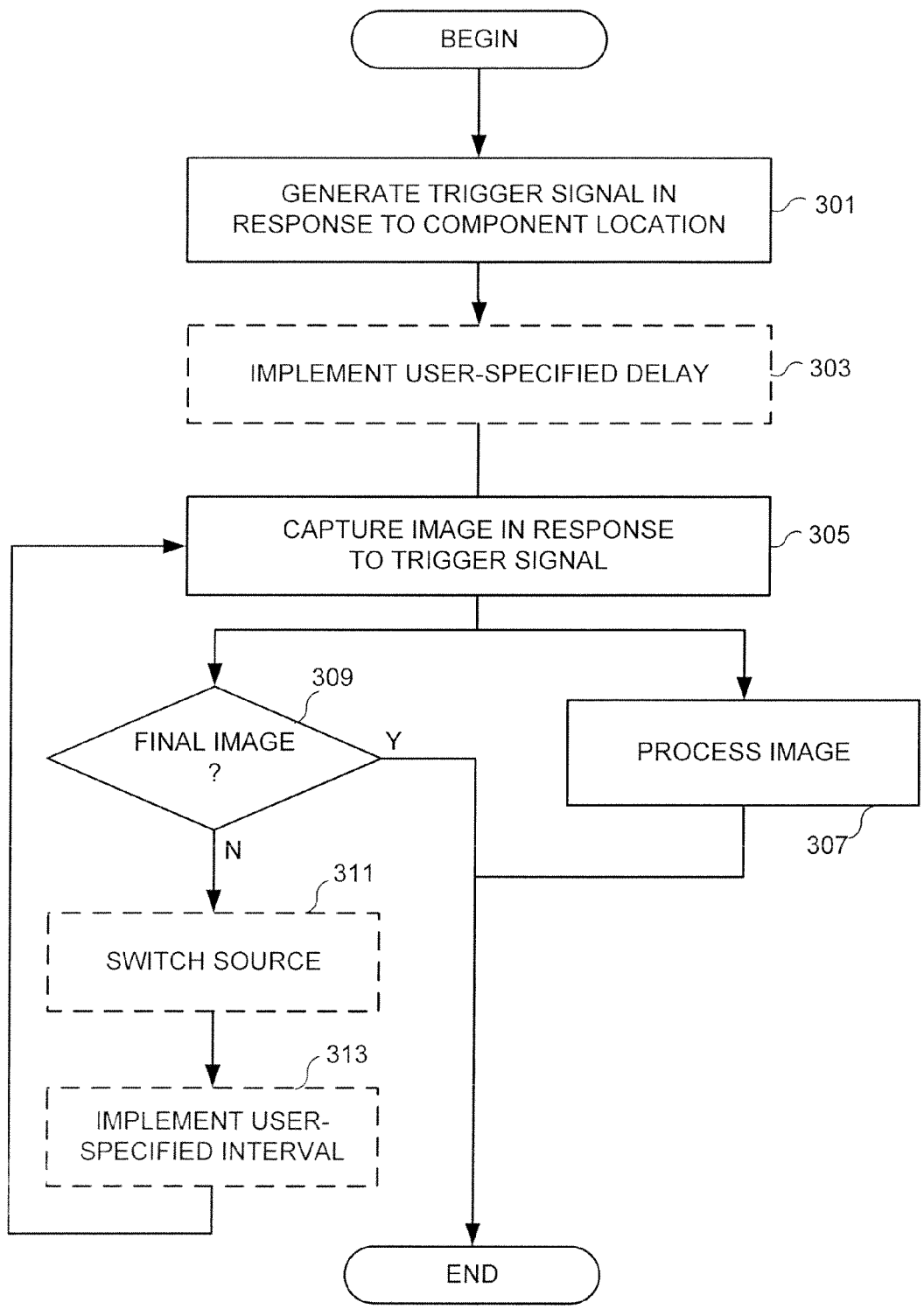
FIG. 3 is a flow diagram illustrating an embodiment of a flow of events in accordance with the teachings of the present invention.

With reference now primarily to FIG. 3, an embodiment of a flow of events in the automated identification system 101 (see, e.g., FIG. 1) is shown in accordance with the teachings of the present invention. As mentioned previously, as a component (e.g., the component 109, FIG. 1) travels through the automated identification system 101, a triggering device (e.g., the triggering device 107, FIG. 1) may generate a trigger signal in response to a location of the component 109 (see, e.g., process block 301).

The image system 113 may then receive the trigger signal from the triggering device 107 and implement, via software for example, a user-specified delay, if any (see, e.g., process block 303) prior to capturing a first image in response to the trigger signal (see, e.g., process block 305). It will be noted that process block 303, as well as process blocks 311 and 313, shown in FIG. 3, are illustrated with broken lines to indicate that they may or may not occur in various embodiments in accordance with the teachings of the present invention. Following any user-specified delay, the first image is captured (see, e.g., block 305), transferred to a memory (e.g., the memory 209, FIG. 2), and processed (see, e.g., process block 307) to identify and read any symbol codes (e.g., symbol codes 111a and 111b, FIG. 1), or a portion of any symbol codes, that have been captured within the first image.

Concurrently with the processing of the captured image (see, e.g., block 307), a determination may be made (see, e.g., process block 309) as to whether an additional image is also to be captured (i.e., according to a user-specified protocol). If an additional image is to be captured (see, e.g., block 309), the process may enter an iterative loop beginning again at process block 305 with the capture of at least one subsequent image. Each subsequently captured image may then be stored in the memory 209, for example, and processed (see, e.g., block 307) in a manner similar to the first image. It will be appreciated that a symbol code (e.g., the symbol codes 111a and 111b, FIG. 1) may be contained within one, or a combination of two or more, of the multiple images captured in accordance with the teachings of the present invention. In embodiments in which a symbol code is partially captured in two or more successive images, processing the multiple images to identify and read the symbol code may include reconstruction or "stitching" of the symbol code to form a whole unit equivalent to capturing the entire symbol code in a single one of the multiple images.

In various embodiments in accordance with the teachings of the present invention, the source for the next successive image capture may be switched (e.g., between the internal image sensor 207 of the image system/apparatus 113/201, and the external camera 115) (see, e.g., process block 311), and/or a user-specified interval may be implemented (see, e.g., process block 313) before the next successive image capture, as will be discussed hereinafter. The switching of the source for the image capture (see, e.g., block 311), and/or the implementation of the user-specified interval (see, e.g., block 313) creates a potential for a wide range of possible image capture scenarios, such as those illustrated in FIGS. 4-12, and discussed below.

Figure 4:
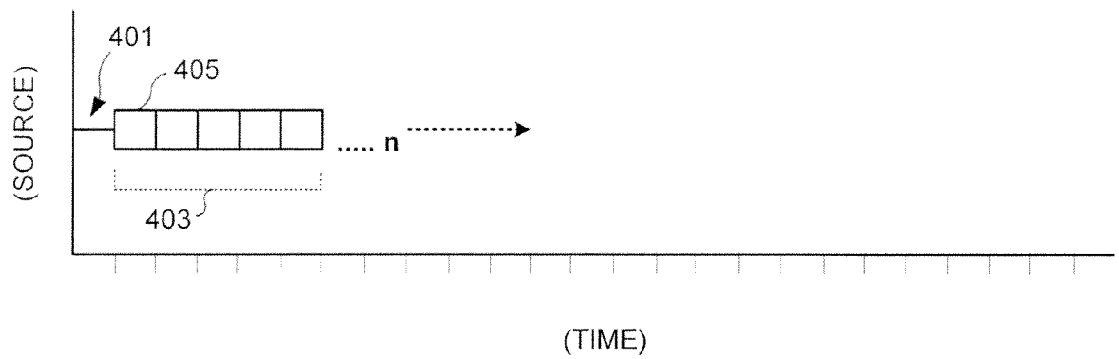
FIGS. 4-6 are illustrations of example event timelines showing a series of image captures via a single source in accordance with the teachings of the present invention.
Figure 5:
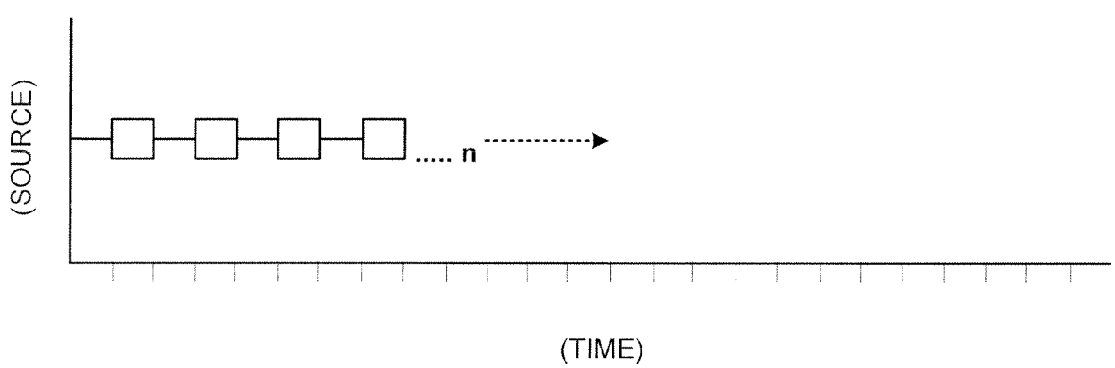
Figure 6:
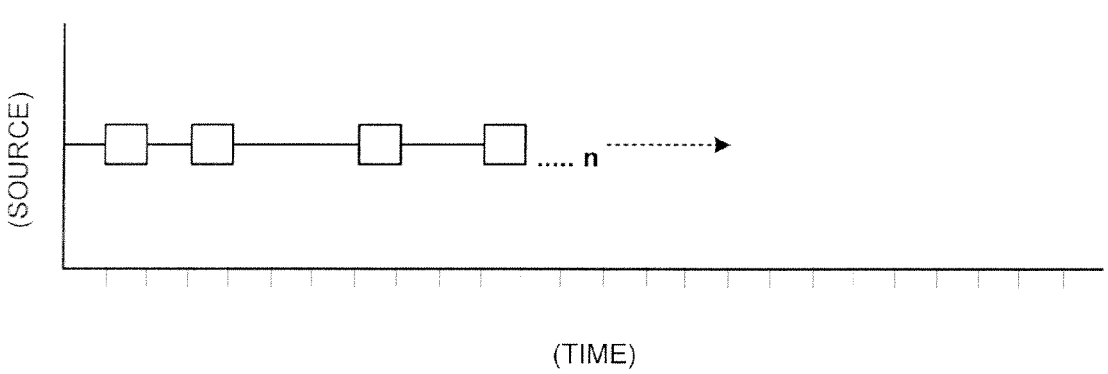

For example, FIGS. 4-6 illustrate example event timelines showing a series of image captures 403 via a single source (e.g., the internal image sensor 207, FIG. 2 of the image system 113, FIG. 1) in accordance with the teachings of the present invention. In the embodiments illustrated in FIGS. 4-6, each of the first image captures 405 in the series of image captures 403 is preceded by a user-specified delay 401 (see, e.g., process block 303, FIG. 3). It will be appreciated that in other embodiments the delay 401 may not be implemented, and the first image capture may immediately follow receipt and processing of the trigger signal by the image system 113 (see, e.g., FIG. 1).

FIG. 4 illustrates a scenario in which multiple images are captured in series via a single source without implementing a user-specified interval (or implementing a user-specified interval having a duration equal to zero). FIG. 5 illustrates a scenario in which multiple images are captured in series via a single source while implementing a user-specified interval between successive image captures in which each interval has a duration that is identical to each other interval in the series. FIG. 6 illustrates a scenario in which multiple images are captured in series via a single source while implementing a user-specified interval between successive image captures in which each interval has a duration that is distinct from each other interval in the series. It will be noted that the distinct interval durations illustrated in FIG. 6 does not preclude an embodiment in which two or more, but not all, of the intervals have an equal duration.

Similarly, FIGS. 7-12 illustrate example event timelines showing a series of image captures via multiple sources (e.g., the internal image sensor 207, FIG. 2, and the external camera 115, FIG. 1). In one embodiment, the capture of multiple images via multiple sources includes configuring the image system 113 to receive an input from an external component, such as the external camera 115, via switching between available sources in response to user-specified criteria. In various embodiments in accordance with the teachings of the present invention, the user-specified criteria may include an image-capture-quantity parameter, a time parameter, or the like.

Figure 7:
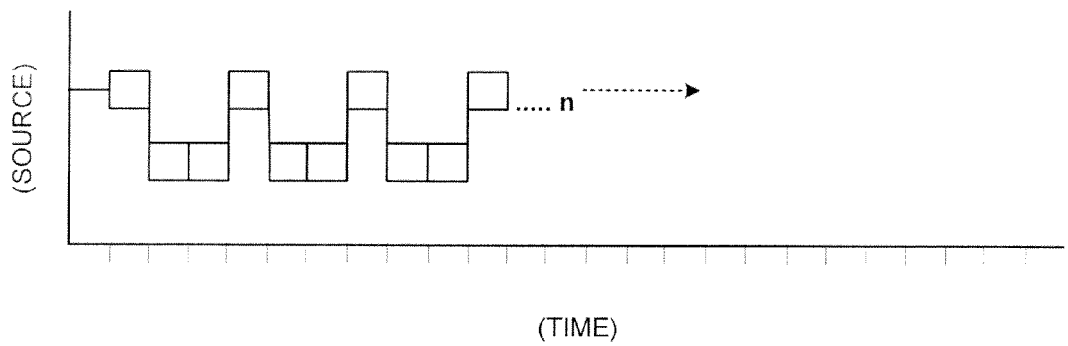
FIGS. 7-9 are illustrations of example event timelines showing a series of image captures via multiple sources wherein switching between the multiple sources occurs in response to a user-specified image-capture-quantity parameter in accordance with the teachings of the present invention.
Figure 8:
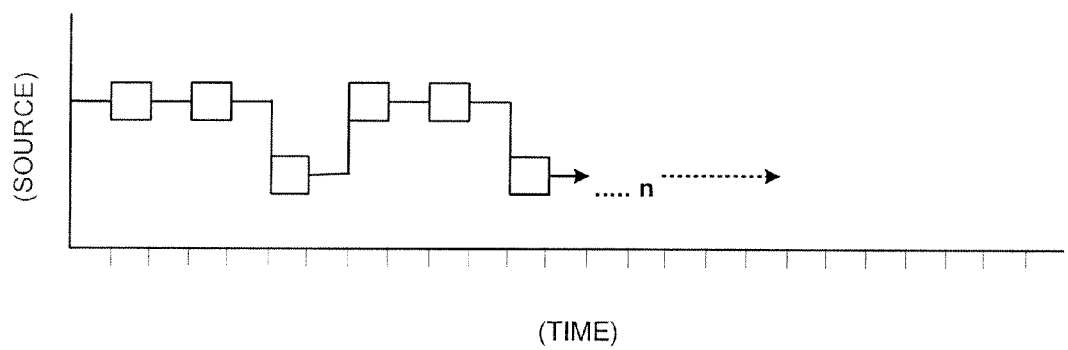
Figure 9:
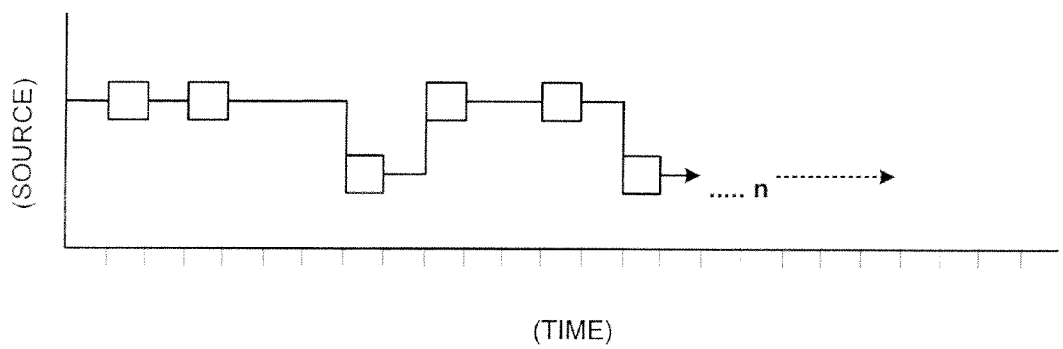

FIGS. 7-9 illustrate example event timelines showing a series of image captures via multiple sources wherein switching between the multiple sources comprises a response to the user-specified image-capture-quantity parameter. For example, in the embodiment illustrated in FIG. 7, a first source (e.g., the internal image sensor 207 of the apparatus 201, FIG. 2) may correspond to an image-capture-quantity parameter equal to one, while a second source (e.g., the external camera 115, FIG. 1) may correspond to an image-capture-quantity parameter equal to two. With regard to the foregoing defined parameters, the image system 113 (see, e.g., FIG. 1) will switch from the first source following capture of a single image, and then switch from the second source following capture of two subsequent images, and so on.

In a similar manner, FIG. 8 illustrates an embodiment of a series of image captures in which the first source corresponds to an image-capture-quantity parameter equal to two, and the second source corresponds to an image-capture-quantity parameter equal to one. In addition, an identical user-specified interval is defined to precede each successive image capture, as described above in conjunction with FIG. 5, regardless of source. FIG. 9 illustrates yet another embodiment of a series of image captures in which the first source corresponds to an image-capture-quantity parameter equal to two, the second source corresponds to an image-capture-quantity parameter equal to one, and a distinct user-specified interval is defined to precede each successive image capture, regardless of source.

Figure 10:
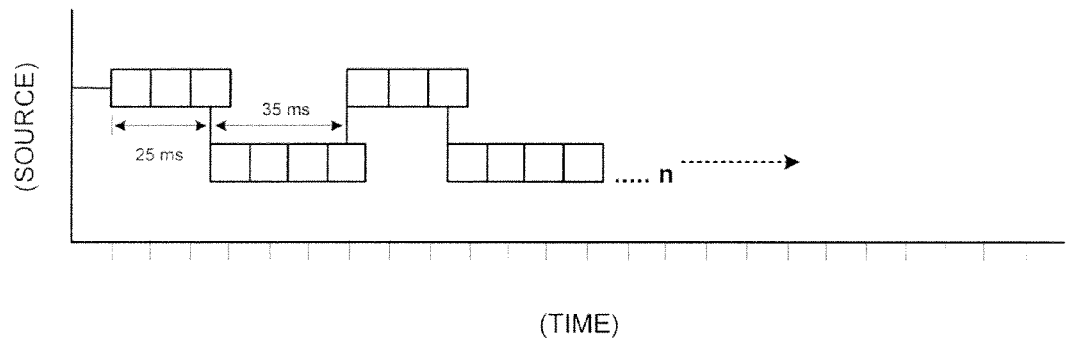
FIGS. 10-12 are illustrations of example event timelines showing a series of image captures via multiple sources wherein switching between the multiple sources occurs in response to a user-specified time parameter in accordance with the teachings of the present invention.
Figure 11:
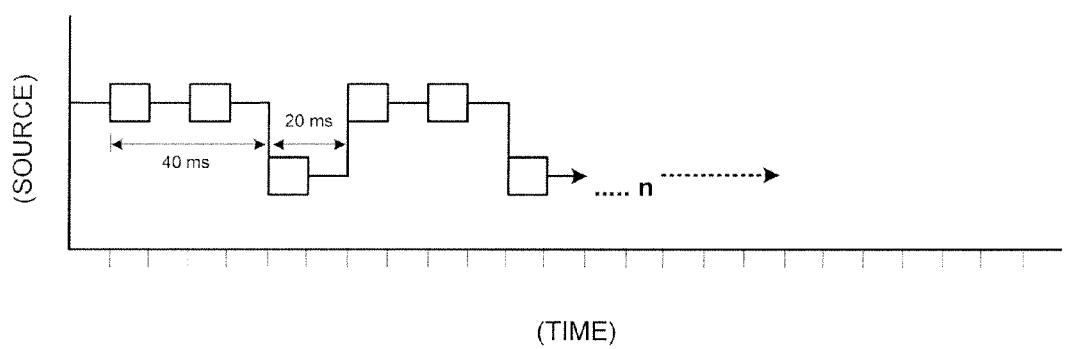
Figure 12:
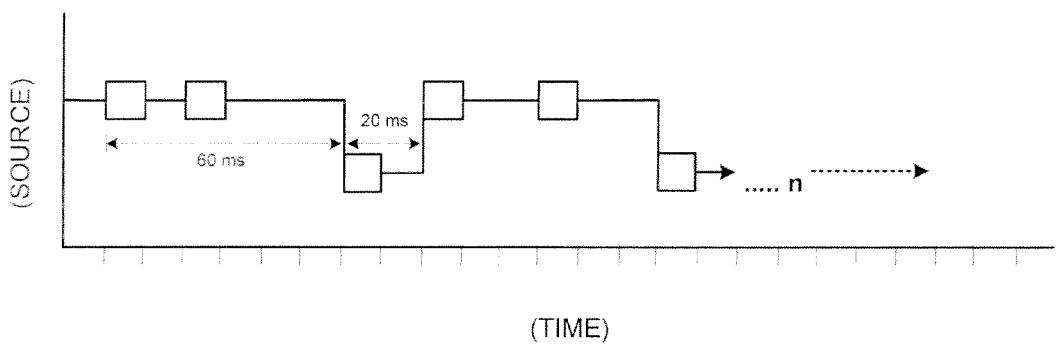

FIGS. 10-12 are illustrations of example event timelines showing a series of image captures via multiple sources wherein switching between the multiple sources comprises a response to a user-specified time parameter in accordance with the teachings of the present invention. For example, in the embodiment illustrated in FIG. 10, a first source may correspond to a time parameter equal to 25 milliseconds ("ms"), while a second source may correspond to a time parameter equal to 35 ms. The image system (e.g., the image system 113, FIG. 1) may switch from the first source or from the second source after the time defined by the corresponding time parameter has elapsed. It will be appreciated that in one embodiment, the switch between the multiple sources may occur during an image capture, as illustrated in FIG. 10. It will also be appreciated that the specific time periods used herein in conjunction with FIGS. 10-12 are intended only as example, and should not be construed to limit the scope of the present invention. For example, in another embodiment in accordance with the teachings of the present invention, the time parameter corresponding to the multiple sources may be in a range of from about 100 ms to about 200 ms.

In a similar manner, FIG. 11 illustrates an embodiment of a series of image captures in which the first source may correspond to a time parameter equal to 40 ms, while the second source may correspond to a time parameter equal to 20 ms. In addition, an identical user-specified interval is defined to precede each successive image capture, as described above in conjunction with FIG. 5, regardless of source. FIG. 12 illustrates yet another embodiment of a series of image captures in which the first source corresponds to a time parameter equal to 60 ms, the second source corresponds to a time parameter equal to 20 ms, and a distinct user-specified interval is defined to precede each successive image capture, regardless of source.

Figure 14:
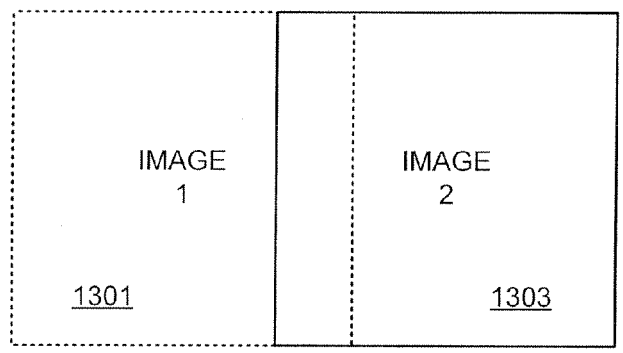
FIG. 14 is a pictorial illustration of the pair of example images of FIG. 13 overlapping to effectively extend a field of view in accordance with the teachings of the present invention.
Figure 15:
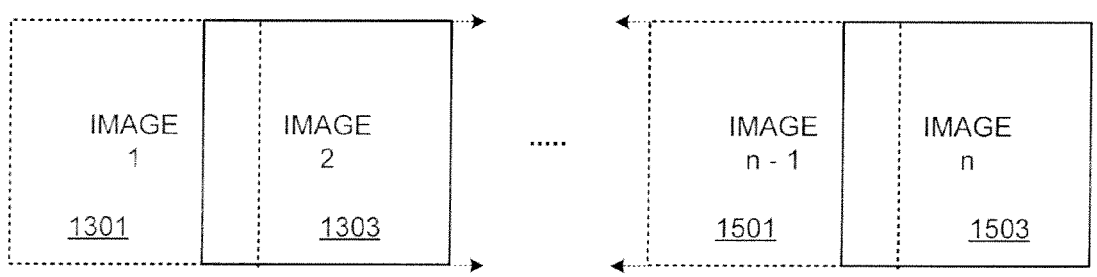
FIG. 15 is a pictorial illustration of a plurality of example images, including the pair of example images of FIG. 13, overlapping to effectively extend the field of view in accordance with the teachings of the present invention.

It will be appreciated that the number of image captures in a series corresponding to any one trigger signal may vary in different embodiments in accordance with the teachings of the present invention. For example, in one embodiment, a series of multiple images may include the capture of a total of ten images via one or more sources. It will be appreciated that there is an inherent limitation in the number of images that may be captured in conjunction with any given trigger signal, assuming that the component (e.g., the component 109, FIG. 1) is moving through the automated identification system 101 (see, e.g., FIG. 1). By capturing a greater number of images, the effective field of view of the image system 113 may be extended to aid in the successful identification and reading of any symbol codes (e.g., the symbol codes 111a and 111b, FIG. 1) affixed to the surface 119 of the component 109 in the automated identification system 101. For example, FIGS. 13-15 are pictorial illustrations of representative captured images, and demonstrate the relationship among multiple images that may be obtained from a single source via methodologies of the present invention.

Figure 13:
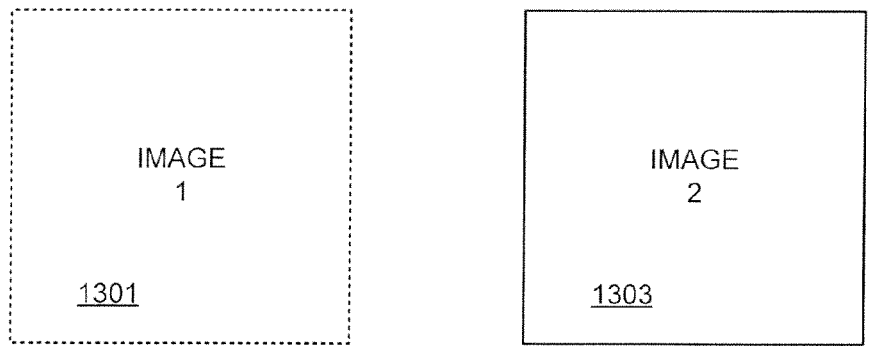
FIG. 13 is a pictorial illustration of a pair of example images in accordance with the teachings of the present invention.

FIG. 13 shows a pair of captured images 1301 and 1303 that may represent completely distinct portions of the surface 119 of the component 109 moving through the automated identification system 101 (see, e.g., FIG. 1). The captured images 1301 and 1303 may be completely distinct either because of the duration of the user-specified interval implemented between the successive images 1301 and 1303, as discussed above, or based on the speed of the conveyor belt 103 (see, e.g., FIG. 1), or the like, or a combination of such factors. In any event, consideration of the speed at which components are moving through the automated identification system 101 (FIG. 1) and/or the user-specified interval between successive image captures, enables the user to capture slightly overlapping images, such as those illustrated in FIG. 14. Overlapping the image captures increases image-processing quality by helping to ensure that any symbol codes (e.g., the symbol codes 111a and 111b, FIG. 1) affixed to the surface 119 of the component 109 (FIG. 1) will be captured in an image to permit processing and accurate identification and reading thereof. This enables the user of the automated identification system 101 (FIG. 1) to rely less on the setup of the image system in relation to the position of the triggering device, and/or timing issues related to the speed of the components (e.g., the component 109) to accurately identify and read symbol codes (e.g., the symbol codes 111a and 111b, FIG. 1).

It will be appreciated that any number of images may be linked together in the manner described above to further increase the effective field of view of the image system (e.g., the image system 113, FIG. 1) without the necessity to alter any optics associated with the image system 113. For example, FIG. 15 is a pictorial illustration showing a plurality of example images in which captured images 1301 and 1303 are shown in conjunction with two additional images 1501 and 1503, representing the "n−1"th and "n"th images in the overlapping series. It will be appreciated however, that because each captured image will also require processing, extending the effective field of view too far beyond a range necessary to maximize image-processing quality, creates an inefficiency in the processing of the captured images for identification and reading purposes, thereby reducing the benefits associated with methodologies in accordance with the teachings of the present invention.

It will further be appreciated that the image capture sources such as the image system 113 itself and/or the external camera 115 may be configured to capture images in either an analog or a digital format, depending on the particular components used in an application. As mentioned previously, where an analog signal is generated to represent the captured image, an analog-to-digital converter and/or a frame grabber component may be used to condition the signal for processing via a DSP or the like.

In one embodiment, user-specified preferences, such as the delay, the interval, and/or the switching criteria described above, may be administered via a graphical user-interface, or the like, via a computer or other user device.

Figure 16:
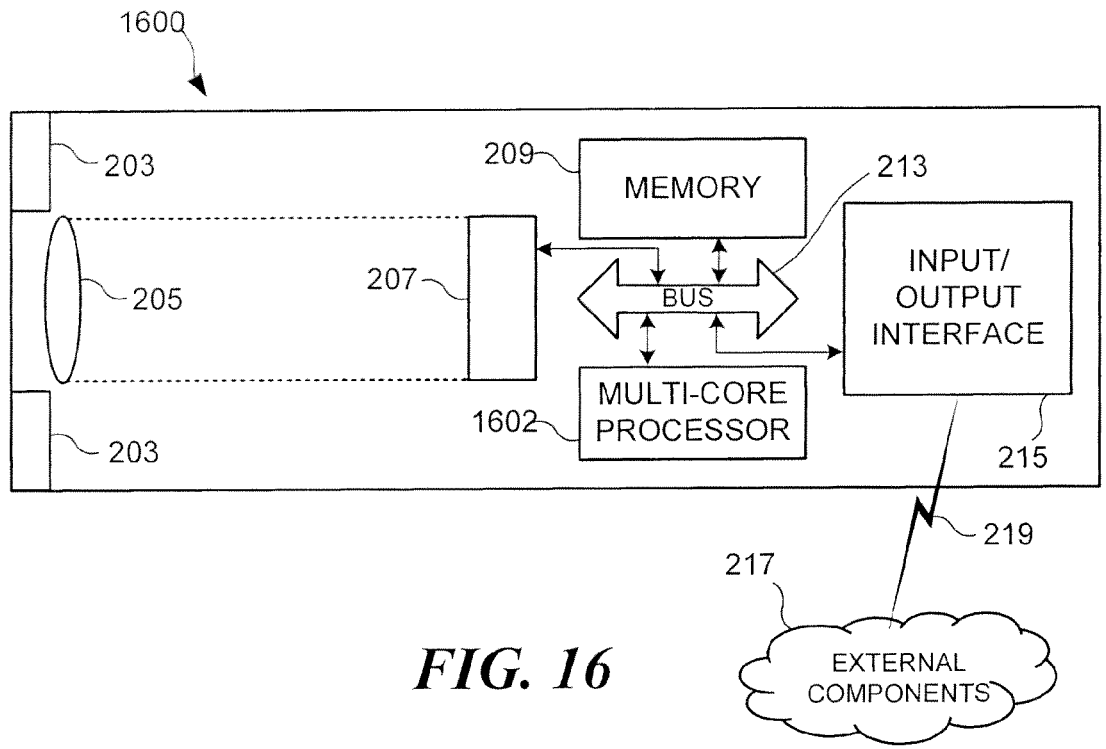
FIG. 16 is a block diagram illustration of an alternative embodiment of image system in accordance with the teachings of the present invention.

FIG. 16 illustrates an alternative embodiment of an apparatus 1600 that can be used as image system 113 in the automated identification system shown in FIG. 1. Apparatus 1600 is in many respects similar to apparatus 201 shown in FIG. 2: it includes an illumination element 203, a lens 205 for collecting and focusing light, an internal image sensor 207, and a bus 213 to enable communication with other elements of apparatus 1600. A memory 209 and a processor 1602 can also be coupled to the bus 213. As with apparatus 201, apparatus 1600 can also use input/output interface 215 to interface with external components 217, such as for example but not limited to, triggering device 107, external camera 115, and/or display 117. Different embodiments of apparatus 1600 can include the various embodiments of these individual elements discussed above for apparatus 201, while an automatic identification system using apparatus 1600 can include all the element embodiments discussed above for system 101.

The primary difference between apparatus 1600 and apparatus 201 lies in processor 1602. In apparatus 201, processor 211 can be a suitable commercially available processor, digital signal processor ("DSP"), or the like. Processor 1602 can similarly be commercially available, but differs from processor 211 in that processor 1602 is a multi-core, multi-thread processor. Multi-core processor 1602 includes two or more processing cores, each capable of processing data independently of the others and each capable of running multiple threads. Multi-core, multi-thread processor 1602 is further described below in connection with FIG. 17.

Figure 17:
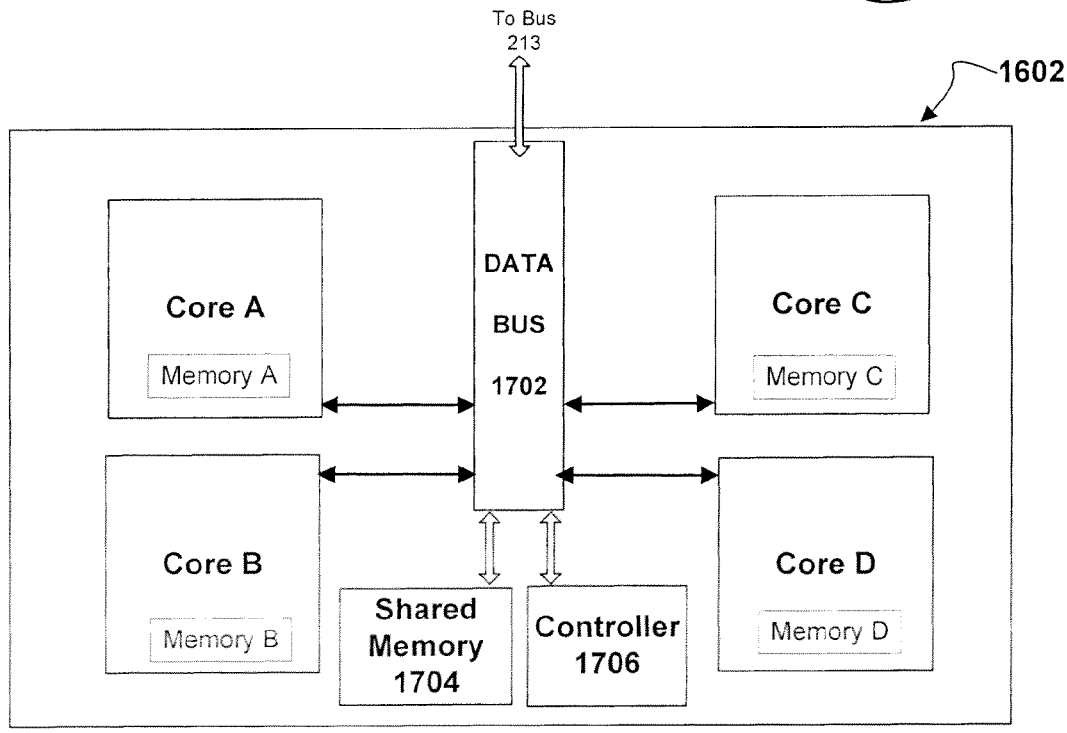
FIG. 17 is a block diagram illustration of an embodiment of a multi-core processor that can be used in the image system embodiment shown in FIG. 16.

FIG. 17 illustrates an embodiment of multi-core processor 1602. Among other things, multi-core processor 1602 includes four processing cores A-D, each of which can include its own dedicated memory, and each of which is coupled to a processor data bus 1702. Data bus 1702 is also coupled to a shared memory 1704 and a controller 1706.

Each of processor cores A-D in multi-core processor 1602 is separate from the other cores and is capable of operating independently from any of the others, but is also able to work together with other cores. Each core A-D is also capable of running multiple threads. In one embodiment, processor cores A-D are formed on the same die, making processor 1602 a monolithic multi-core processor, but in other embodiments the cores of multi-core processor 1602 can be formed on separate dies or substrates. Moreover, while the illustrated embodiment shows a processor with four cores, in other embodiments processor 1602 can include more or less cores. In one embodiment, each core within multi-core processor 1602 can be a general-purpose processor, while in other embodiments each core can be an application specific integrated circuit (ASIC) or a field-programmable gate array (FPGA). Still other embodiments of multi-core processor 1602 can include combinations of general-purpose, ASIC and FPGA cores. In yet other embodiments, the entire processor 1602 can be an ASIC with multiple cores or an FPGA with multiple cores.

Data bus 1702 is coupled to each of cores A-D and allows the individual cores to communicate with each other, as well as with external devices such as apparatus bus 213 (see FIG. 16). To maximize data throughput, data bus 1702 can be a very high-speed bus. In one embodiment, data bus 1702 can includes dedicated data channels to transfer data from each core to devices external to processor 1602, as well as dedicated data channels for communication with other cores, with shared memory 1704, or with controller 1706. Although only one data bus is shown in the illustrated embodiment, other embodiments of processor 1602 can include more data buses.

Shared memory 1704 is coupled to data bus 1702 to allow each of the individual processing cores A-D to write to and read from the shared memory. To maximize throughput in processor 1602, shared memory 1704 can be a high-speed (i.e., short access time) memory such as RAM, DRAM, SRAM, SDRAM and the like. In one embodiment, shared memory 1704 can be partitioned so that each core has its own dedicated section of the memory, while in other embodiments the entire shared memory 1704 can be available to each of the cores. Although shown in the illustrated embodiment as a single unit, in other embodiments shared memory 1704 can be made up of one or more separate memories.

Controller 1706 is coupled to data bus 1702, and through data bus 1702 to cores A-D and shared memory 1704. Controller 1706 can control communication between cores A-D and external devices, as well as communication between the cores. In other embodiments, controller 1706 can also be directly coupled to each core. Controller 1706 can also perform other functions such as core scheduling, mediating memory access conflicts when different cores and/or threads try to access the same area of memory, etc.

Figure 18:
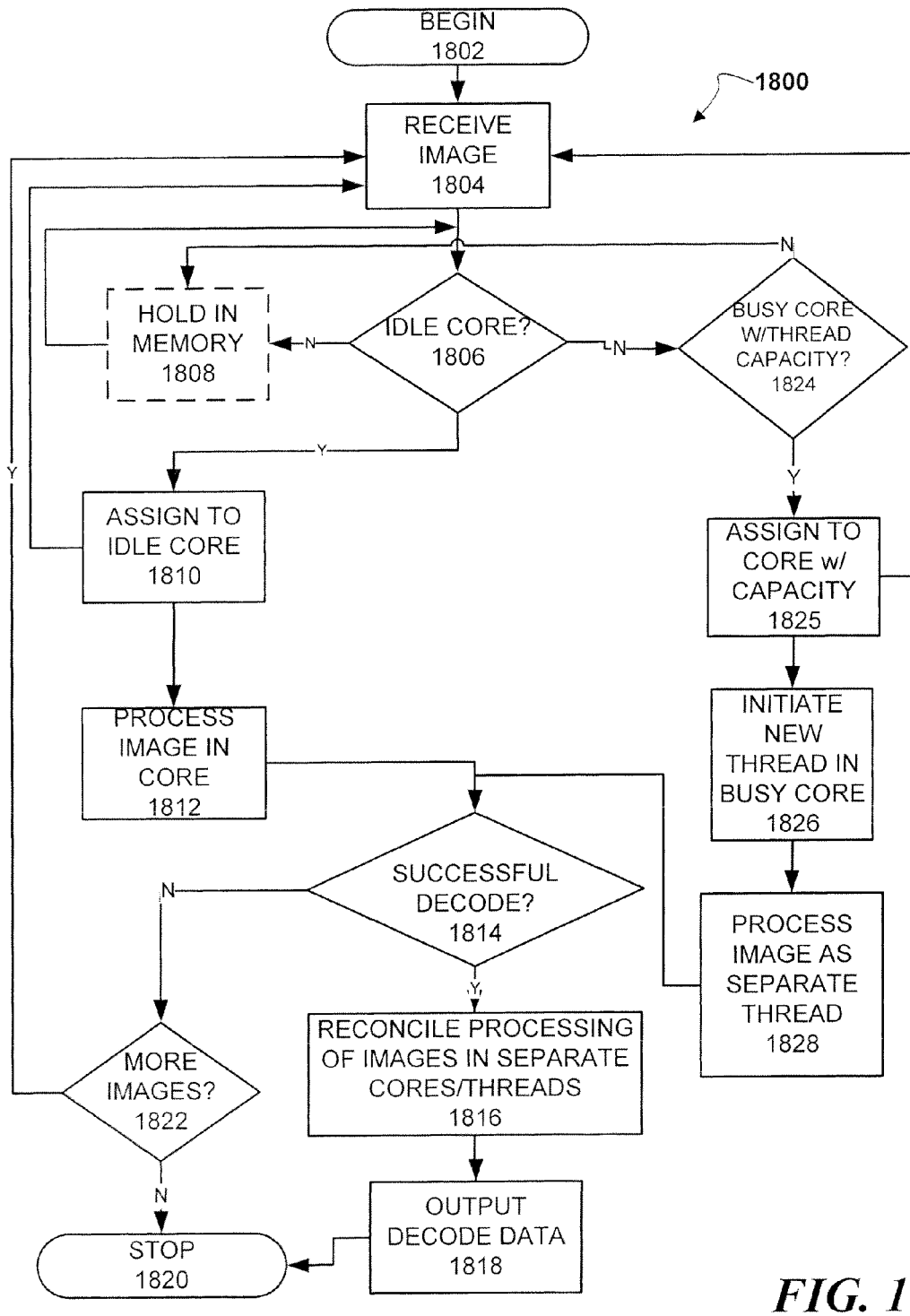
FIG. 18 is a flow diagram illustrating an embodiment of a flow of events for processing images in a multi-core processor in an image system such as the one shown in FIG. 16.

FIG. 18 illustrates an embodiment of a process 1800 by which multi-core processor 1602 can process multiple images generated by apparatus 1600. The process starts at block 1802 with the receipt of a trigger signal from triggering device 107, which causes device 113 and, if present, imaging device 115 to begin capturing images (see FIG. 1). At block 1804, processor 1602 captures an image from image sensor 207, memory 209 and/or input/output interface 215. As explained above, the multiple images received by the processor can originate from a single source as illustrated in FIGS. 4-6 or from multiple sources as illustrated in FIGS. 7-12.

As each image comes in, at block 1806 the process checks to see if there is an idle core (i.e., a core that is not currently busy) available to process the image. If at block 1806 the process finds an idle core that can process the image, then at block 1810 the image is assigned to that core and process 1800 returns to block 1804 to receive more images while the assigned image is processed. At block 1812 the core to which the image was assigned processes the image data according to some processing and decoding logic.

If at block 1806 the process finds that no cores are currently idle, the process has two choices. First, it can optionally proceed to block 1808, where it holds the image in memory until a check at block 1806 indicates that an idle core is available to process the image, at which time the image is sent from memory to the idle core. Alternatively, if the process finds no idle cores at block 1806 it can proceed to block 1824, where it checks whether any of the currently busy cores has available capacity to initiate a new thread to process the image. If no core has capacity to initiate a new thread, then the process moves to block 1808 and puts the image data into memory until an idle core or a core with thread capacity becomes available.

If at block 1824 the process finds a core that can initiate a new thread to process the image, then at block 1825 the image is assigned to that core and process 1800 returns to block 1804 to receive more images while continuing to process images already assigned. When the core receives the image assigned to it at block 1825, at block 1826 that core initiates a thread and at block 1828 the initiated thread processes the image data.

At block 1814, the process checks with all the cores processing images from a given source to seen whether any of the cores or threads has been a successfully decoded an image from a given source. If at block 1814 the process determines that there has not been a successful decode of an image from a given source, then it returns to block 1804 to receive further images from that source for processing. If at block 1814 the process instead determines that there has been a successful decode of an image from the given source, it proceeds to block 1816 where it reconciles the processing of images from the same source by multiple cores and/or threads.

In one embodiment, reconciling processing of multiple images from the same source can simply mean signaling to other cores and/or threads that are still processing data from the same source that a successful decode has been obtained, so that the other cores and/or threads can stop their processing. For example, in the image capture sequences shown in FIGS. 4-12, each individual image in the sequence could be assigned to a different core and/or a different thread for processing. The object of capturing multiple images as shown is to obtain at least one complete image of a symbol code and to then process that complete image to decode the symbol. As soon as one of the cores and/or threads obtains a successful decode of an image from a given source at block 1814, there is no need for any of the other cores and/or threads to continue processing images from that source that may have been assigned to them. Rather than allow the other cores and/or threads to continue computing and wasting computational resources, the core or thread that obtained the first successful decode can signal other cores processing images from the same source so that those cores can stop processing. At block 1818, the process outputs the successfully decoded data and at block 1820 the process stops.

Figure 19:
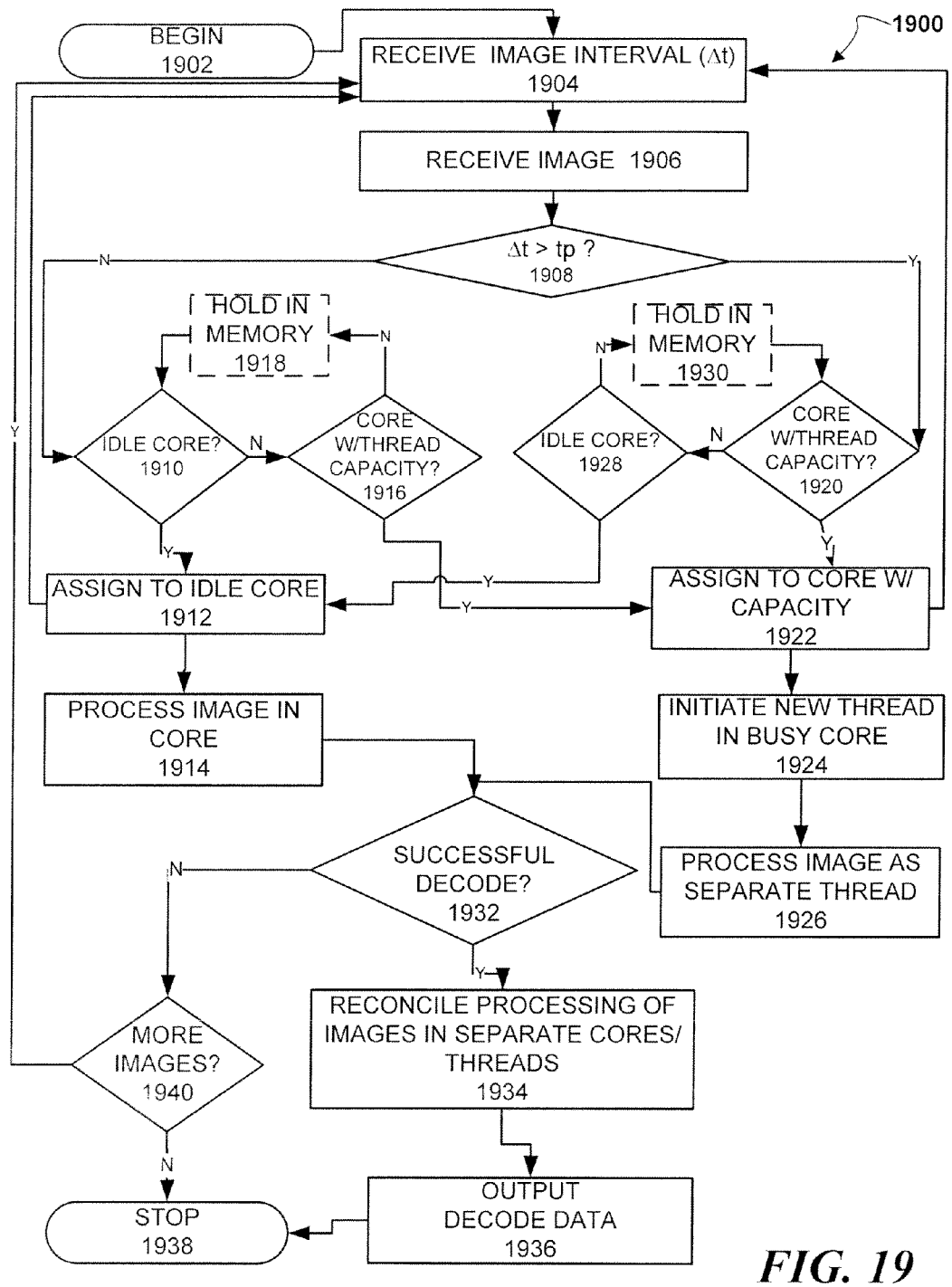
FIG. 19 is a flow diagram illustrating an alternative embodiment of a flow of events for processing images in a multi-core processor in an image system such as the one shown in FIG. 16.

FIG. 19 illustrates an alternative embodiment of a process 1900 by which a multi-core processor can process multiple images generated by apparatus 1600. The process starts at block 1902 with receipt of a trigger signal from triggering device 107, which causes device 113 and, if present, additional imaging device 115 to begin capturing images (see FIG. 1). As explained above, the multiple images received by the processor can originate from a single source as illustrated in FIGS. 4-6 or from multiple sources as illustrated in FIGS. 7-12. At block 1904, the processor receives the current user-specified interval $\Delta t$ between successive image captures and at block 1906 it receives an image from image sensor 207, memory 209 and/or input/output interface 215.

At block 1908, the process compares the current user-specified interval $\Delta t$ with an expected processing time $t_p$ for the received image. The expected processing time $t_p$ can depend on factors such as the size of the image (i.e., the amount of data in the image), the number of images currently being processed, the number and type of cores in the processor, etc. In one embodiment, expected processing times could be established with prior benchmarking tests and stored in a look-up table that the processor could use to look up an expected processing time for a particular image. In another embodiment, the expected processing time could be established using timing data reported by each core within the processor. In still other embodiments, the expected processing time could be a statistically-based measure, for example a time within a set number of standard deviations of a mean processing time. In yet other embodiments, $\Delta t$ can be compared to a range of possible processing times instead of a single processing time.

If at block 1908 the process determines that the user-specified interval $\Delta t$ is not greater than (i.e., less than) the expected processing time $t_p$ for the received image, the process goes to block 1910, where it checks to see if there is an idle core (i.e., a core that is not currently busy) available to process the image. If at block 1910 the process finds an idle core, then at block 1912 the image is assigned to that core and process 1900 returns to block 1906 to receive more images while also proceeding to block 1914, where the core to which the image was assigned processes the image according to some processing and decoding logic.

If at block 1910 the process finds no idle cores, then the process moves to block 1916, where it checks whether any busy cores have capacity to initiate a new thread to process the image. If there is a core with available thread capacity, the image is sent to that core at block 1922, but if there is no core with available thread capacity the image is held in memory at block 1918 until an idle core or a core with thread capacity becomes available. In the illustrated process, block 1916 provides the option of attempting to assign an image to a thread if no idle core is available, so that the image need not sit in memory waiting for an idle core when a thread is available. In other embodiments of process 1900, block 1916 can be bypassed and the image held in memory at block 1918 until an idle core is available at block 1910. This could occur, for example, if a particular image is best processed by an idle core so that available threads can be held for other images best processed by a thread. In still other embodiments, the decision on whether to bypass or use block 1916 can depend on the magnitude of $|\Delta t - t_p|$.

If at block 1908 the process determines that the user-specified interval $\Delta t$ is greater than the expected processing time $t_p$ for the received image, the process goes to block 1920, where it checks whether any of the currently busy cores has available capacity to initiate a new thread to process the image. If at block 1920 the process finds a core that can initiate a new thread to process the image, then at block 1922 the image is assigned to that core and process 1900 returns to block 1904 to receive more images while continuing to process images already assigned. When the core receives the image assigned to it at block 1922, at block 1924 that core initiates a thread and at block 1926 the initiated thread processes the image data according to some processing and decoding logic.

If at block 1920 no core has capacity to initiate a new thread, then the process moves to block 1928, where it checks whether any idle cores are available to process the image. If there is an idle core available, the image is sent to the idle core at block 1912, but if no idle core is available then the image is held in memory at block 1930 until a core with thread capacity or an idle core becomes available. In the illustrated process, block 1928 provides the option of attempting to assign an image to an idle core if no thread capacity is available in a busy core, so that the image need not sit in memory waiting for a thread when an idle core is available. In other embodiments of process 1900, block 1928 can be bypassed and the image held in memory at block 1930 until a thread is available at block 1920. This could occur, for example, a particular image is best processed by a thread so that an idle core can be held for images best processed by an idle core. In still other embodiments, the decision on whether to bypass or use block 1928 can depend on the magnitude of $|\Delta t - t_p|$.

At block 1932 the process checks with all the cores processing images from a given source to see whether any of the cores or threads has been a successfully decoded an image from a given source. If at block 1932 the process determines that there has not been a successful decode of an image from a given source, then it returns to block 1904 to receive further user-specified intervals and images from that source for processing. If at block 1932 the process instead determines that there has been a successful decode of an image from the given source, it proceeds to block 1934 where it reconciles the processing of images from the same source by multiple cores and/or threads.

In one embodiment, reconciling processing of multiple images from the same source can simply mean signaling to other cores and/or threads that are still processing data from the same source that a successful decode has been obtained, so that the other cores and/or threads can stop their processing. For example, in the image capture sequences shown in FIGS. 4-12, each individual image in the sequence could be assigned to a different core and/or a different thread for processing. The object of capturing multiple images as shown is to obtain at least one complete image of a symbol code and to then process that complete image to decode the symbol. As soon as one of the cores and/or threads obtains a successful decode of an image from a given source at block 1932, there is no need for any of the other cores and/or threads to continue processing images from that source that may have been assigned to them. Rather than allow the other cores and/or threads to continue computing and wasting computational resources, the core or thread that obtained the first successful decode can signal other cores processing images from the same source so that those cores can stop processing. At block 1936, the process outputs the successfully decoded data and at block 1938 the process stops.

Figure 20:
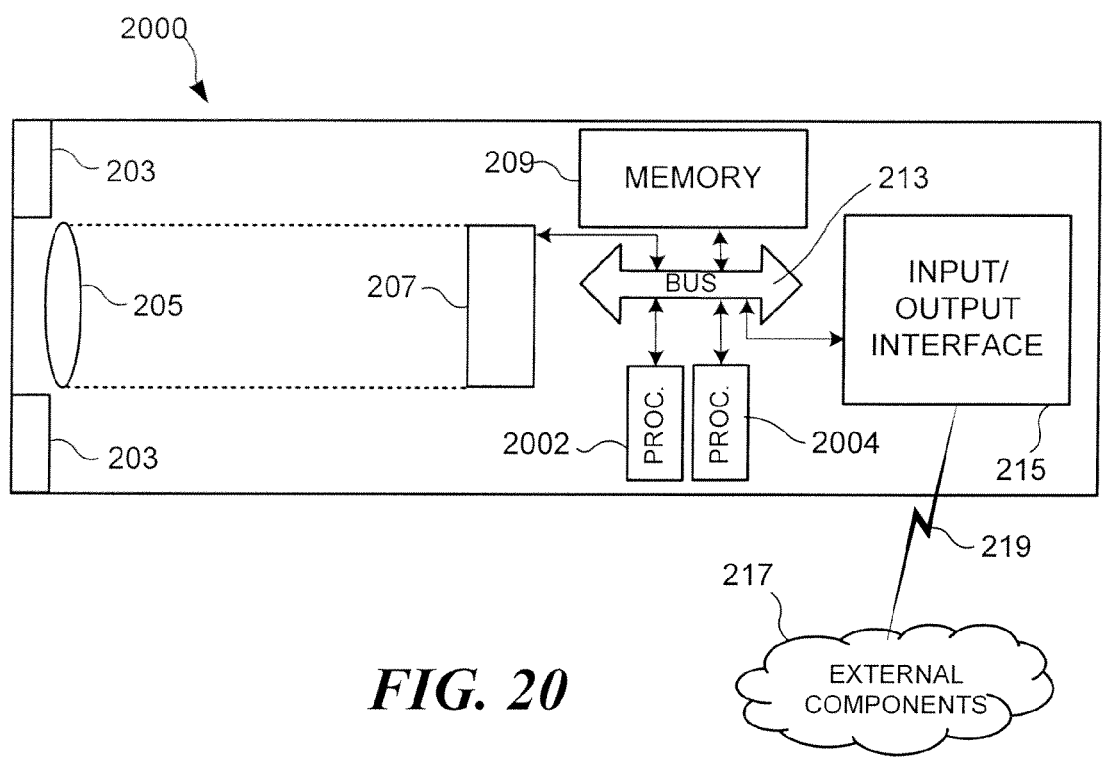
FIG. 20 is a block diagram illustration of another alternative embodiment of an image system in accordance with the teachings of the present invention.

FIG. 20 illustrates another alternative embodiment of an apparatus 2000 that can be used as image system 113 in the automated identification system shown in FIG. 1. Apparatus 2000 is in many respects similar to apparatus 201 and apparatus 1600: it includes an illumination element 203, a lens 205 for collecting and focusing light, an internal image sensor 207, and a bus 213 to enable communication with other elements of the apparatus. A memory 209 and a processor 1602 can also be coupled to the bus 213. As with apparatuses 201 and 1600, apparatus 2000 can also use input/output interface 215 to interface with external components 217, such as for example but not limited to, triggering device 107, external camera 115, and/or display 117. Different embodiments of apparatus 2000 can include the various embodiments of these individual elements discussed above for apparatus 201, while an automatic identification system using apparatus 2000 can include all the element embodiments discussed above for system 101.

The primary difference between apparatus 2000 and apparatuses 201 and 1600 lies in the processor. Apparatus 2000 uses multiple separate processors instead of a single processor; the illustrated embodiment shows two separate processors, but in other embodiments apparatus 2000 can use a different number of separate processors 2002 and 2004. In one embodiment, each of processors 2002 and 2004 can be a suitable commercially available processor, digital signal processor ("DSP"), or the like as in apparatus 201, but in other embodiments processors 2002 and 2004 can be multi-core processors as in apparatus 1600. In still other embodiments, all processors need not be of the same type: the multiple separate processors in apparatus 2000 can include some single-core processors and some multi-core processors.

Among other advantages, having multiple separate processors can allow for processor specialization. In one embodiment, processor 2002 can be assigned to process only images from image sensor 207 while processor 2004 can be assigned to process all images received from other sources through interface 215. In such an embodiment where images from multiple other sources are received through interface 215, processor 2004 can be a multi-core processor while processor 2002 can be a single-core processor since it receives images from only one source.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

The invention claimed is:

1. A method, comprising:
   receiving a single trigger signal communicated from a triggering device in response to a location of a component in an automated identification system;
   capturing multiple images of at least a portion of a surface of the component in response to the trigger signal, the multiple images comprising a series of images including a first image and at least one subsequent image, wherein capturing the multiple images comprises capturing at least one of the multiple images via an external camera coupled to the automated identification system, and wherein capturing at least one of the multiple images via the external camera includes configuring the automated identification system to receive an input from the external camera via switching to the external camera in response to user-specified criteria that include an image-capture-quantity parameter; and
   processing the multiple images in a multi-core, multi-thread processor to identify and read a symbol code, if any, contained within at least one or a combination of two or more of the multiple images.

2. The method of claim 1, wherein processing the multiple images comprises processing each of the multiple images in parallel with capturing a successive image, if any, in the series of images.

3. The method of claim 1, further comprising transmitting an output to a coupled display to enable generation of a visual rendering of the first image or the at least one subsequent image on the display.

4. The method of claim 1, further comprising a user-specified delay preceding capturing the first image, the user-specified delay having a defined duration.

5. The method of claim 1, wherein capturing each successive image in the series of images follows a user-specified interval having a defined duration.

6. The method of claim 1, wherein capturing at least one of the multiple images via an external camera further includes configuring the automated identification system to receive an input from an internal image sensor via switching to the internal image sensor in response to the user-specified criteria.

7. The method of claim 1 wherein processing the multiple images in a multi-core, multi-thread processor comprises:
   assigning each image to an idle core for processing; and
   if no idle core is available, initiating a thread in a busy core to process the image.

8. The method of claim 1 wherein processing the multiple images in a multi-core, multi-thread processor comprises:
   initiating a thread in a busy core to process each image; and
   if no thread capacity is available in a busy core, assigning the image to an idle core for processing.

9. The method of claim 1, further comprising reconciling the processing of images from a same source by multiple cores, multiple threads, or both multiple cores and multiple threads.

10. The method of claim 9 wherein reconciling comprises notifying other threads or cores processing images from the same source when one thread or core successfully decodes the symbol code.

11. An article of manufacture, comprising:
    a machine-readable medium that provides instructions, including instructions to:
      process a received trigger signal communicated from a triggering device in response to a location of a component in an automated identification system;
      capture multiple images of at least a portion of a surface of the component in response to the received trigger signal, the multiple images comprising a series of images including a first image and at least one subsequent image, wherein the instructions to capture multiple images include instructions to switch between two or more sources configured to capture the multiple images, wherein the instructions to switch between the two or more sources include instructions to switch from one source to another source in response to an occurrence of user-specified criteria that include an image-capture-quantity parameter;
      store the multiple images in a memory; and
      process the multiple images in a multi-core, multi-thread processor to identify and read a symbol code, if any, contained within at least one or a combination of two or more of the multiple images.

12. The article of manufacture of claim 11, wherein the instructions to capture multiple images include instructions to implement a user-specified delay prior to capture of the first image, the user-specified delay having a defined duration.

13. The article of manufacture of claim 12, wherein the defined duration equals zero.

14. The article of manufacture of claim 11, wherein the instructions to capture multiple images include instructions to implement a user-specified interval following each image capture in the series of images, the user-specified interval having a defined duration.

15. The article of manufacture of claim 11 wherein processing the multiple images in a multi-core, multi-thread processor comprises:
    assigning each image to an idle core for processing; and
    if no idle core is available, initiating a thread in a busy core to process the image.

16. The article of manufacture of claim 11 wherein processing the multiple images in a multi-core, multi-thread processor comprises:
    initiating a thread in a busy core to process each image; and
    if no thread capacity is available in a busy core, assigning the image to an idle core for processing.

17. The article of manufacture of claim 11, further comprising reconciling the processing of images from the same source by multiple cores, multiple threads, or both multiple cores and multiple threads.

18. The article of manufacture of claim 17 wherein reconciling comprises notifying other threads or cores processing images from the same source when one thread or core successfully decodes the symbol code.

19. A method comprising:
    receiving a single trigger signal communicated from a triggering device in response to a location of a component in an automated identification system;
    capturing multiple images of at least a portion of a surface of the component in response to the trigger signal, the multiple images comprising a series of images including a first image and at least one subsequent image, wherein capturing the multiple images comprises capturing at least one of the multiple images via an external camera coupled to the automated identification system, and wherein capturing at least one of the multiple images via the external camera includes configuring the automated identification system to receive an input from the external camera via switching to the external camera in response to user-specified criteria that include a time parameter; and
    processing the multiple images in a multi-core, multi-thread processor to identify and read a symbol code, if any, contained within at least one or a combination of two or more of the multiple images.

20. The method of claim 19 wherein processing the multiple images comprises processing each of the multiple images in parallel with capturing a successive image, if any, in the series of images.

21. The method of claim 19 further comprising transmitting an output to a coupled display to enable generation of a visual rendering of the first image or the at least one subsequent image on the display.

22. The method of claim 19 further comprising a user-specified delay preceding capturing the first image, the user-specified delay having a defined duration.

23. The method of claim 19 wherein capturing each successive image in the series of images follows a user-specified interval having a defined duration.

24. The method of claim 19 wherein capturing at least one of the multiple images via an external camera further includes configuring the automated identification system to receive an input from an internal image sensor via switching to the internal image sensor in response to the user-specified criteria.

25. The method of claim 19 wherein processing the multiple images in a multi-core, multi-thread processor comprises:

assigning each image to an idle core for processing; and
if no idle core is available, initiating a thread in a busy core to process the image.

26. The method of claim 19 wherein processing the multiple images in a multi-core, multi-thread processor comprises:
initiating a thread in a busy core to process each image; and
if no thread capacity is available in a busy core, assigning the image to an idle core for processing.

27. The method of claim 19, further comprising reconciling the processing of images from a same source by multiple cores, multiple threads, or both multiple cores and multiple threads.

28. The method of claim 27 wherein reconciling comprises notifying other threads or cores processing images from the same source when one thread or core successfully decodes the symbol code.

29. An article of manufacture comprising:
a machine-readable medium that provides instructions, including instructions to:
process a received trigger signal communicated from a triggering device in response to a location of a component in an automated identification system;
capture multiple images of at least a portion of a surface of the component in response to the received trigger signal, the multiple images comprising a series of images including a first image and at least one subsequent image, wherein the instructions to capture multiple images include instructions to switch between two or more sources configured to capture the multiple images, wherein the instructions to switch between the two or more sources include instructions to switch from one source to another source in response to an occurrence of user-specified criteria that include a time parameter;
store the multiple images in a memory; and
process the multiple images in a multi-core, multi-thread processor to identify and read a symbol code, if any, contained within at least one or a combination of two or more of the multiple images.

30. The article of manufacture of claim 29 wherein the instructions to capture multiple images include instructions to implement a user-specified delay prior to capture of the first image, the user-specified delay having a defined duration.

31. The article of manufacture of claim 30 wherein the defined duration equals zero.

32. The article of manufacture of claim 29 wherein the instructions to capture multiple images include instructions to implement a user-specified interval following each image capture in the series of images, the user-specified interval having a defined duration.

33. The article of manufacture of claim 29 wherein processing the multiple images in a multi-core, multi-thread processor comprises:
assigning each image to an idle core for processing; and
if no idle core is available, initiating a thread in a busy core to process the image.

34. The article of manufacture of claim 29 wherein processing the multiple images in a multi-core, multi-thread processor comprises:
initiating a thread in a busy core to process each image; and
if no thread capacity is available in a busy core, assigning the image to an idle core for processing.

35. The article of manufacture of claim 29, further comprising reconciling the processing of images from the same source by multiple cores, multiple threads, or both multiple cores and multiple threads.

36. The article of manufacture of claim 35 wherein reconciling comprises notifying other threads or cores processing images from the same source when one thread or core successfully decodes the symbol code.

* * * * *